United States Patent
Kaneshiro et al.

(10) Patent No.: US 6,808,424 B2
(45) Date of Patent: Oct. 26, 2004

(54) MEMORY CARD INSTALLER

(75) Inventors: Tetsuya Kaneshiro, Osaka (JP);
Takashi Hiraoka, Osaka (JP);
Katsuhiko Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/257,543

(22) PCT Filed: Apr. 9, 2001

(86) PCT No.: PCT/JP01/03029
§ 371 (c)(1),
(2), (4) Date: Oct. 15, 2002

(87) PCT Pub. No.: WO01/80171
PCT Pub. Date: Oct. 25, 2001

(65) Prior Publication Data
US 2003/0109179 A1 Jun. 12, 2003

(30) Foreign Application Priority Data

Apr. 18, 2000 (JP) .................................... 2000-116221
Apr. 19, 2000 (JP) .................................... 2000-117591

(51) Int. Cl.$^7$ .............................................. H01R 25/00
(52) U.S. Cl. ........................................ 439/638; 439/630
(58) Field of Search ................................ 439/638, 630, 439/639, 640; 361/735, 737, 752; 710/102, 13, 62, 301, 303

(56) References Cited

U.S. PATENT DOCUMENTS 6,266,724 B1 * 7/2001 Harari et al. ................ 710/102

FOREIGN PATENT DOCUMENTS

| JP | 3-208116 | 9/1991 |
| JP | 5-298032 | 11/1993 |
| JP | 6-195524 | 7/1994 |
| JP | 7-334316 | 12/1995 |
| JP | 9-81273 | 3/1997 |
| JP | 2000-259775 | 9/2000 |

* cited by examiner

Primary Examiner—Alex Gilman
(74) Attorney, Agent, or Firm—McDermott Will & Emery LLP

(57) ABSTRACT

A memory card installer, comprising a main body having such a shape that can be installed on a memory card installation part provided on a device allowing a memory card to be connected thereto, an installation part allowing a plurality of memory cards to be installed thereto, device side input and output terminals connected electrically to a device side in such a state that the main body is installed on the memory card installation part, a plurality of memory card side input and output terminals connected electrically to each of the memory cards installed in the installation part, and a connection switching part switching the connection of each of the memory card side input and output terminals to the device side input and output terminals.

3 Claims, 14 Drawing Sheets

F I G. 4
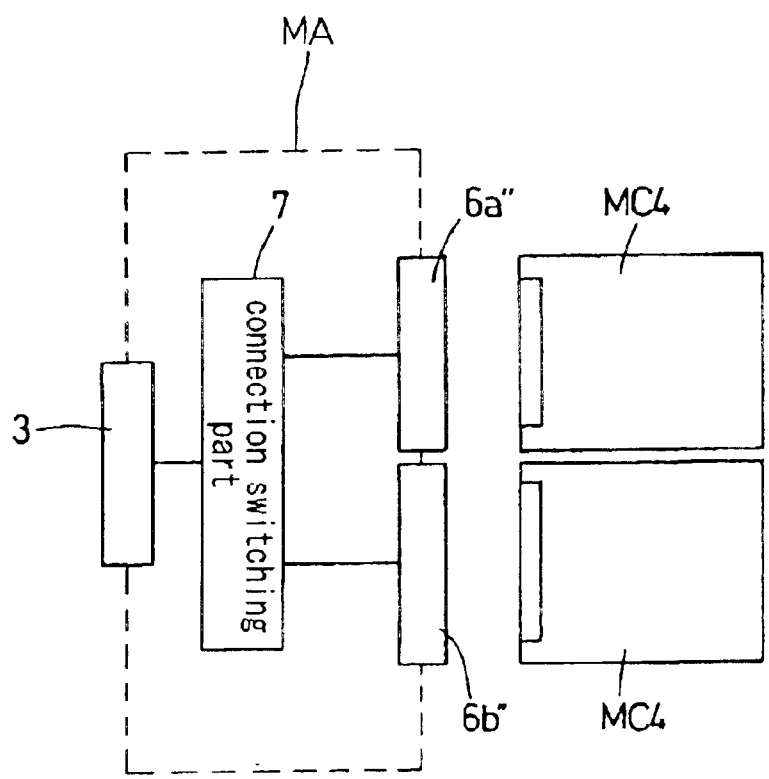

F I G. 5
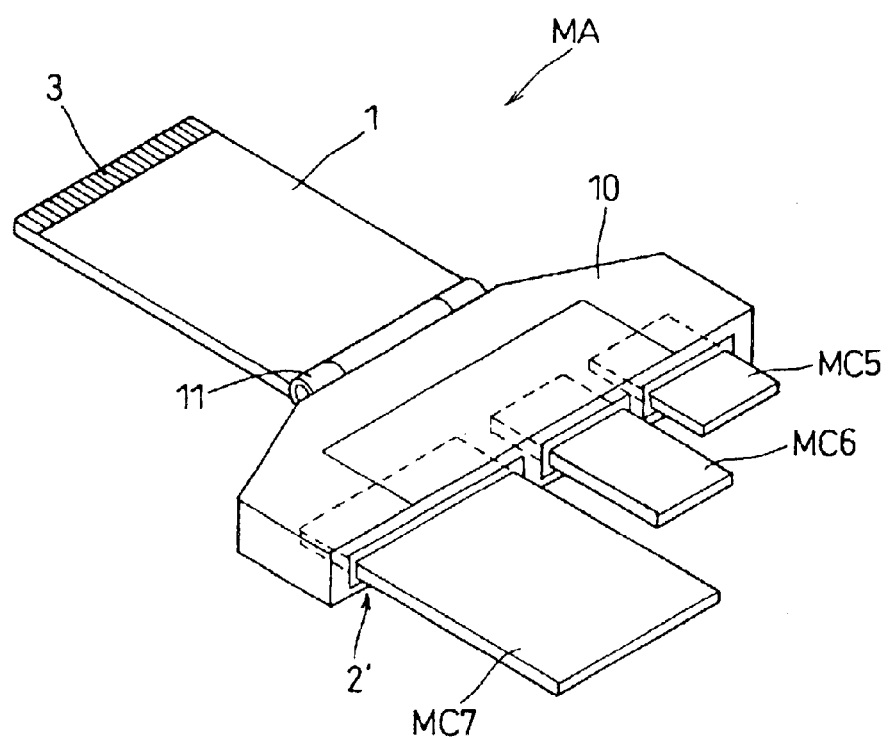

F I G. 7
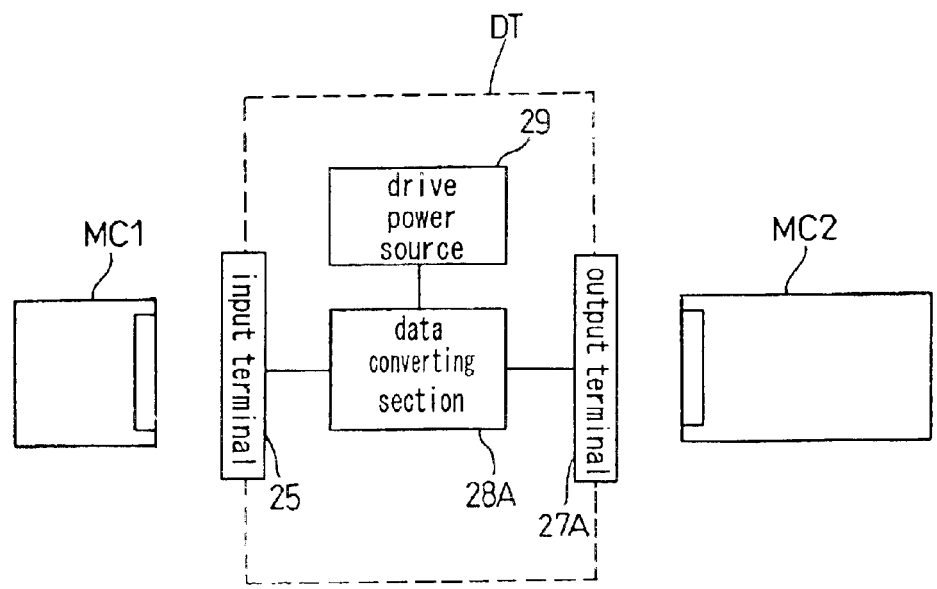

F I G. 1 2
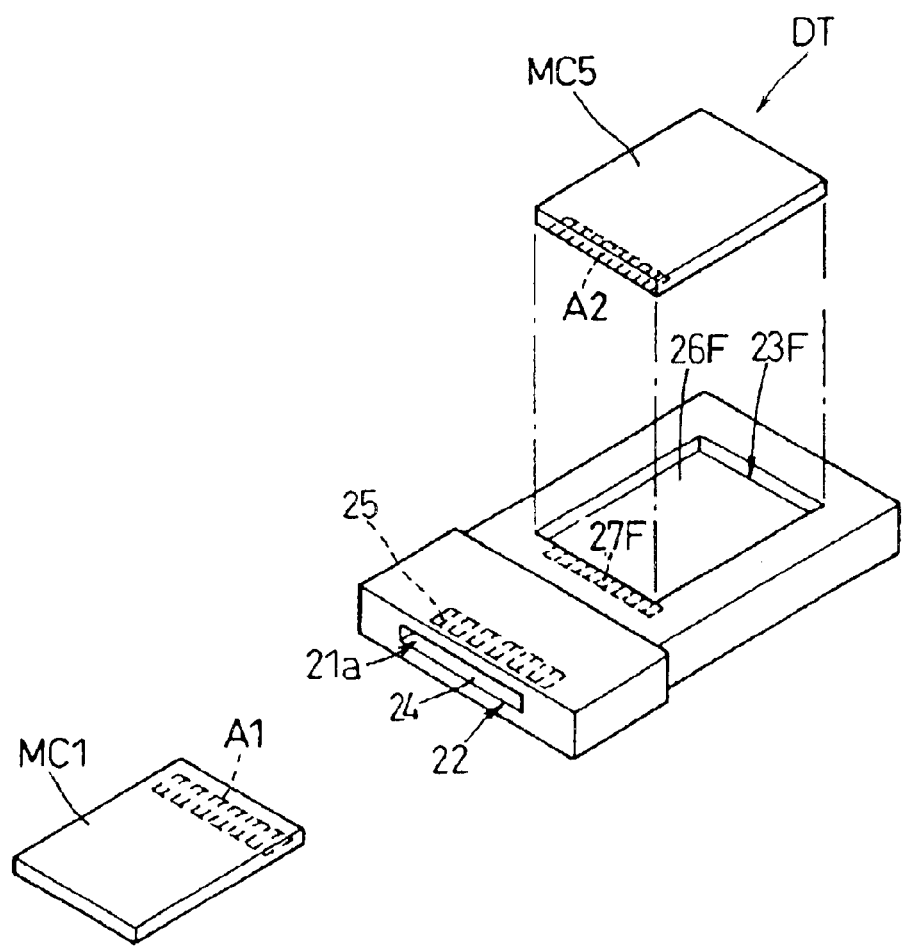

F I G. 1 4
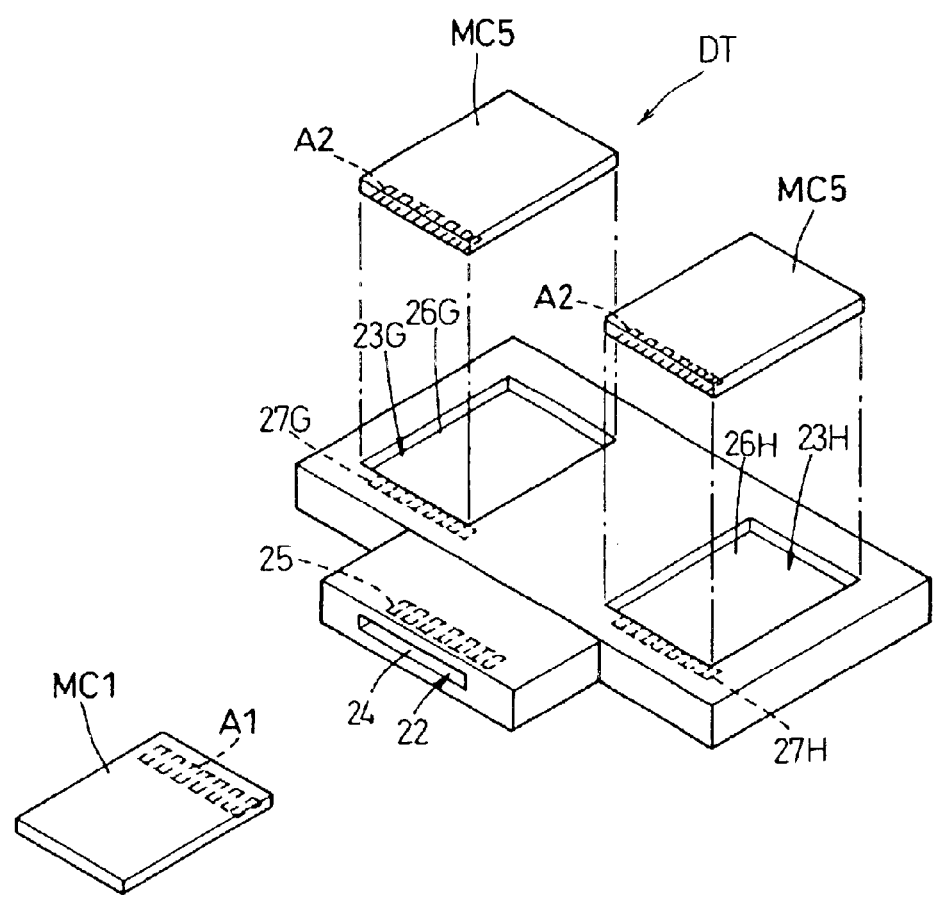

MEMORY CARD INSTALLER

TECHNICAL FIELD

The present invention relates to a memory card installer for installing a memory card generally used as a portable recording medium in order to transmit data to the memory card. More specifically, the present invention relates to a memory card adapter for mutually transmitting between a device such as a personal computer and a portable telephone and a memory card which does not adapt to such a device, and a data transmitter for transmitting data between the memory cards as the memory card installer.

BACKGROUND ART

A memory card is generally used as a portable recording medium since it is simply handled and its storage capacity is comparatively large.

A personal computer as one example of an information processing device has a memory card installation part based on various device side memory card connecting standards such as PCMCIA (Personal Computer Memory Card International Association).

The memory card is installed to the memory card installation part of the personal computer so that various data are mutually transmitted between the memory card and the personal computer.

A memory card adapter as the memory card installer enables data to be mutually transmitted between a memory card which does not adapt to the memory card connecting standard on the personal computer device side and a personal computer.

Only one memory card can be installed to a conventional memory card adapter. In such a memory card adapter, in the case where data are transmitted to a plurality of memory cards, memory card adapters should be replaced at the memory card installation part of the personal computer, and thus the data transmitting operation becomes troublesome.

Further, in a personal computer, there are plural kinds of memory cards which do not adapt to the device side memory card connecting standard, memory card adapters corresponding to respective memory cards should be prepared, so that the cost increases and the handing of the memory card adapters becomes troublesome.

In addition, there is not a memory card adapter, the data transmission between memory cards requires a troublesome transmitting operation.

Therefore, it is a main object of the present invention to provide a memory card installer which intervenes between an information processing device such as a personal computer and a memory card so as to eliminate a troublesome mutual transmitting operation of data between the information processing device and the memory card, and handing of which is simple.

It is another object of the present invention to provide a memory card installer for transmitting data between such memory cards when no memory card adapter exists.

SUMMARY OF THE INVENTION

A first memory card installer of the present invention has: a main body having a shape that can be installed to a memory card installation part provided to a device connected with a memory card; an installation part to which a plurality of memory cards are installed; a device side I/O terminal which is electrically connected with the device side in a state that the main body is installed to the memory card installation part; a plurality of memory card side I/O terminals which are electrically connected with memory cards, respectively, installed to the installation part; and a connection switching part for switching so as to connect the memory card side I/O terminals, respective to the device side I/O terminal.

The device includes a personal computer, an image processing device and another information processing devices.

The memory card installer includes a memory card adapter and a data transmitter.

According to the first invention, a plurality of memory cards can be electrically connected with the device. For this reason, data can be mutually transmitted between the plural memory cards and the device without replacing the memory card installer. As a result, troublesomeness of the mutual transmitting operation of data between the device and memory cards is eliminated.

In a preferable embodiment of the first invention, a memory card based on another memory card connecting standard different from the device side memory card connecting standard is connected to the device via the memory card adapter, so that data can be mutually transmitted between the memory cards and the device.

In this case, the data can be mutually transmitted between the plural memory cards based on another memory card connecting standard different from the device side memory card connecting standard and the personal computer by one memory card adapter.

In a preferable embodiment of the first invention, the memory card side I/O terminals may be electrically connected with plural memory cards based on different memory card connecting standards, respectively.

In this case, data can be mutually transmitted between the plural memory cards, which are based on a memory card connecting standard different from the device side memory card connecting standard and based on memory card connecting standards different from one another, and the personal computer by one memory card adapter.

In a preferable embodiment of the first invention, data converting sections may convert data captured from one memory card via a terminal composed of the memory card side I/O terminals into data which adapt to the memory card connecting standard on which another memory card connected to another terminal of the memory card side I/O terminals is based so as to output the converted data to the another terminal.

In this case, data can be mutually transmitted between the memory cards based on different memory card connecting standards, respectively, not via the device.

In a preferable embodiment of the first invention, the installation part may have concave portions provided on one surface of the main body for housing the memory cards, and a depth of the concave portions may be equivalent to or not less than a thickness of the memory cards.

In this case, since the installation part is provided to the adapter main body, a shape of the memory card adapter can be miniaturized. Here, since the depth of the concave portions is equivalent to or not less than the thickness of the memory card, the memory cards housed in the concave portions do not protrude from the surface of the adapter main body. For this reason, even in a state that the memory cards are housed in the concave portions, the adapter main body can be installed to a memory card connected device.

In a preferable embodiment of the first invention, the main body further has a protrusion which protrudes from the device in a state that the main body is installed to the device, and the installation part is provided to the protrusion.

In this case, since the protrusion protrudes from the device in the state that the adapter main body is installed to the device, the protrusion can be formed into an arbitrary size. For this reason, the installation part is provided to the protrusion, so that the installation part to which an arbitrary number of memory cards can be installed can be formed.

In a preferable embodiment of the first invention, a connecting part for connecting the protrusion to the main body in a bendable state may be further provided.

In this case, since the protrusion protrudes from the device, it is considered that the protrusion is intrusive during use of the memory card adapter. On the contrary, in this embodiment, since the connecting part is provided so as to support the protrusion in a bendable state, a bending part can be bent to a nonintrusive position by the connecting part.

A memory card installer of a second invention has: an installation part to which a plurality of memory cards are installed; and the data converting sections for capturing data of one memory card (a transmitting source memory card) installed to the installation part and converting the captured data into data which adapt to a memory card connecting standard on which the other memory card is based (a transmitting destination memory card) so as to output the converted data.

According to the second invention, data can be transmitted between memory cards without intervention of the device.

In a preferable embodiment of the second invention, a plurality of output terminals may be provided, and the data converting sections can transmit data of the transmitting source memory card simultaneously to a plurality of the transmitting destination memory cards in order to transmit the data of the transmitting source memory card captured from an input terminal to one or plural transmitting destination memory card(s) via an output terminal.

In this case, since the data of the transmitting source memory card can be transmitted simultaneously to the plural transmitting destination memory cards, troublesomeness of the data transmission between the memory cards can be further eliminated.

In a preferable embodiment of the second invention, in a state that the transmitting source memory card and the transmitting destination memory card are based on different memory card connecting standards, the data converting sections convert the data of the transmitting source memory card captured from the input terminal into the data which adapt to the memory card connecting standard on which the transmitting destination memory card is based so as to transmit the converted data to the transmitting destination memory card via the output terminal.

In this case, since data can be transmitted between the memory cards based on different memory card connecting standards, accordingly troublesomeness of the data transmission between the memory cards can be further eliminated.

In a preferable embodiment of the second invention, a plurality of output terminals which adapt to transmitting destination memory cards based on different memory card connecting standards are provided as the output terminal, and the transmitting section converts the data of the transmitting source memory card captured from the input terminal into data which adapt to the memory card connecting standards on which the transmitting destination memory cards are based, respectively, so as to transmit the converted data to the transmitting destination memory cards, respectively, via the output terminals.

In this case, data can be transmitted from the transmitting source memory card to plural kinds of transmitting destination memory cards based on different connecting standards of the memory card, and since data can be transmitted to plural kinds of memory cards based on different connecting standards, respectively, troublesomeness of the data transmission between the memory cards can be further eliminated.

BRIEF DESCRIPTION OF THE DRAWINGS

FIG. 4 is a block diagram showing a circuit configuration of the memory card adapter of FIG. 1 according to a second modified example.

FIG. 5 is a perspective view showing an appearance shape of the memory card adapter of FIG. 1 according to a third modified example.

FIG. 7 is a block diagram showing a circuit configuration of the data transmitter in FIG. 6.

FIG. 12 is a perspective view showing an appearance shape of the data transmitter according to a fifth embodiment of the present invention.

FIG. 14 is a perspective view showing an appearance shape of the data transmitter according to a sixth embodiment of the present invention.

BEST MODE FOR CARRYING OUT THE INVENTION

Figure 1:
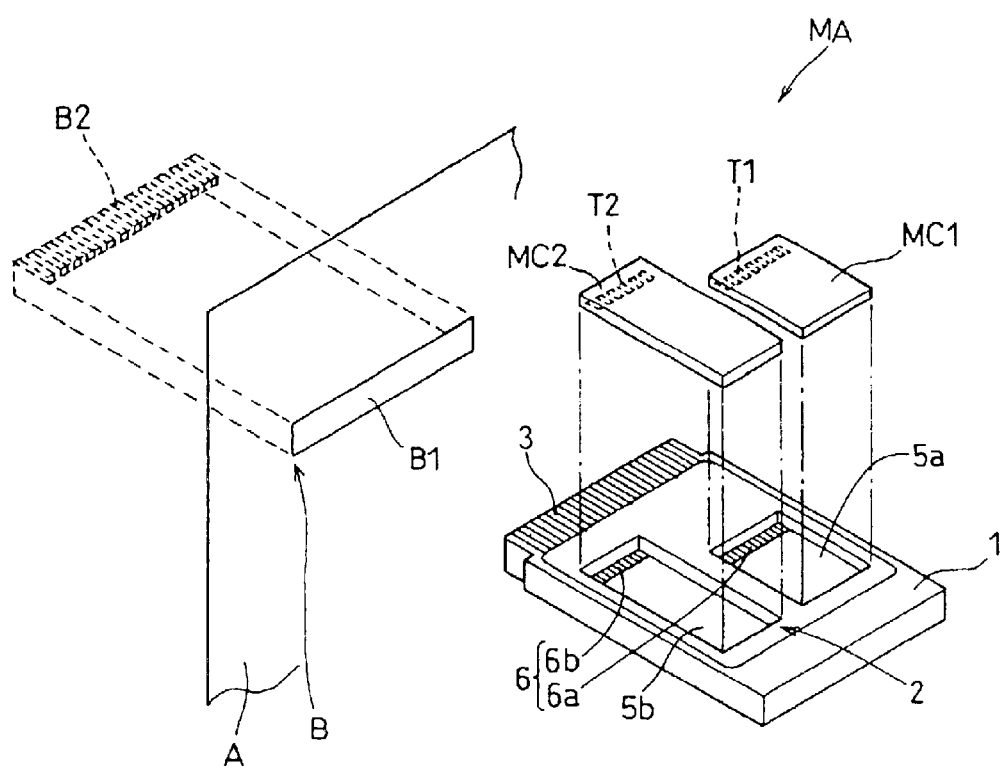
FIG. 1 is a perspective view showing an appearance shape of a memory card adapter according to the best embodiment (first embodiment) of the present invention.
Figure 2:
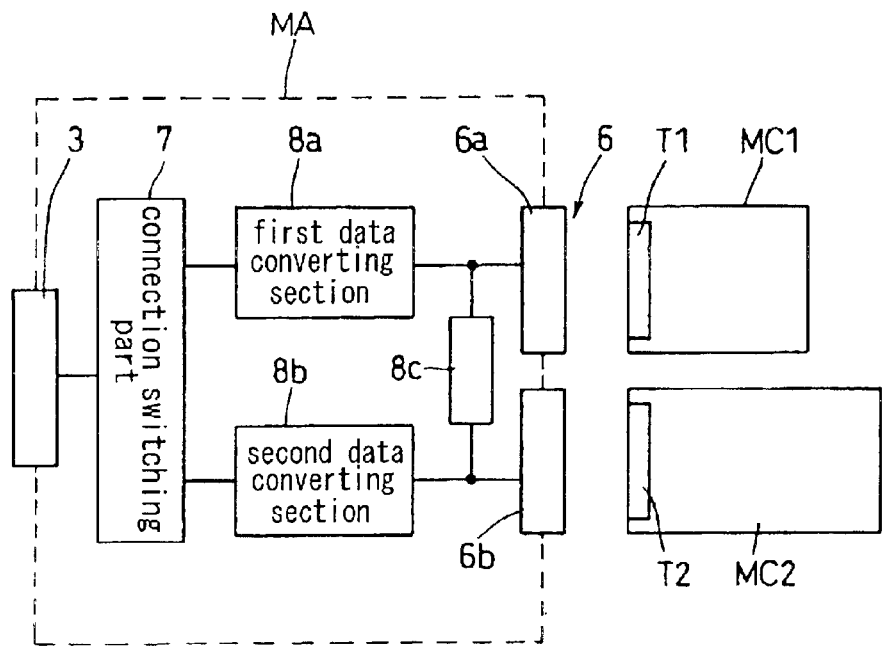
FIG. 2 is a block diagram showing a circuit configuration of the memory card adapter in FIG. 1.

FIG. 1 is an appearance perspective view of a memory card adapter as a memory card installer according to the best embodiment (first embodiment) of the present invention, and FIG. 2 is a block diagram showing its circuit configuration.

In these drawings, MA shows a memory card adapter. The memory card adapter MA is installed to a memory card connected equipment composed of an information processing device such as a personal computer or an image processing device.

In this embodiment, the memory card connected equipment is applied to a personal computer A.

The personal computer A is provided with a function for enabling mutual transmission of data between the personal computer A and a memory card based on general purpose memory card connecting standard (hereinafter, general-purpose connecting standard: here, PCMCIA connecting standard is used as one example).

A side surface of the personal computer A is provided with a memory card installation part B.

Since the memory card based on the general-purpose connecting standard is installed to and electrically connected with the memory card installation part B detachably, so as to have a slot B1 and a connecting terminal B2 provided on a portion beyond the slot B1.

The memory card adapter MA has a main body 1, and an installation part 2 provided on the main body 1.

The main body 1 has an outer shape which is equivalent to a shape of a memory card (concretely, PCMCIA card) which can be inserted into the memory card installation part B of the personal computer A.

An insertion end part of the main body 1 is provided with a device side I/O terminal 3. The device side I/O terminal 3 has a terminal array (the terminal array based on the general-purpose connecting standard [PCMCIA]) which is electrically contacted and connected with the connecting terminal B2 of the memory card installation part B, in a state that the main body 1 is installed to the memory card installation part B.

First and second memory cards MC1 and MC2, which are based on an another memory card connecting standard different from the memory card based on the general-purpose connecting standard and are smaller than the memory card based on the general-purpose connecting standard (plane shape and thickness are smaller), can be installed to the installation part 2.

The first and second memory cards MC1 and MC2 are based on different memory card connecting standards, respectively.

The installation part 2 has plural i.e., two concave portions 5a and 5b in this example, and two memory card side I/O terminals 6a and 6b which adapt to the concave portions 5a and 5b.

The concave portions 5a and 5b have shapes such that the corresponding memory cards MC1 and MC2 can be housed. More concretely, the concave portions 5a and 5b have the planar shape which is similar to the memory cards MC1 and MC2 and a depth which is equivalent to or not less than a thickness of the memory cards MC1 and MC2.

One terminal 6a of the memory card side I/O terminals 6a and 6b is exposed into the concave portion 5a, and has a terminal array which comes in contact with and is electrically connected with the connecting terminal T1 of the first memory card MC1 in the state that the first memory card MC1 is installed into the concave portion 5a.

Similarly, the other terminal 6b of the memory card side I/O input terminals 6a and 6b is exposed into the concave portion 5b, and has a terminal array which comes in contact with and is electrically connected with the connecting terminal T2 of the second memory card MC2 in the state that the second memory card MC2 is installed into the concave portion 5b. The memory card side I/O terminals 6a and 6b compose a memory card side I/O terminal group 6.

Then, a circuit configuration of the memory card adapter MA will be explained below with reference to the block diagram of FIG. 2.

The memory card adapter MA has a connection switching part 7, a first data converting section 8a, a second data converting section 8b and a third data converting section 8c in its inside.

The connection switching part 7 is composed of a mechanical switch or a semiconductor switch, and switches electrical connection of the memory card side I/O terminals 6a and 6b to the device side I/O terminal 3. More concretely, the connection switching part 7 switches and connects one of the memory card side I/O terminals 6a and 6b or both of them into and with the device side I/O output terminal 3.

The first data converting section 8a intervenes between the connection switching part 7 and the memory card side I/O terminal 6a.

The second data converting section 8b intervenes between the connection switching part 7 and the memory card side I/O terminal 6b.

The third data converting section 8c intervenes between the both memory card side I/O terminals 6a and 6b.

The first data converting section 8a demonstrates functions that convert data, which are captured from the device side I/O terminal 3 into the memory card adapter MA (general-purpose connecting standard data), into data of the memory card connecting standard on which the first memory card MC1 is based so as to output the converted data to the memory card side I/O terminal 6a, and convert data, which are captured from the memory card side I/O terminal 6a into the memory card adapter MA (data of the memory card connecting standard on which the first memory card MC1 is based), into general-purpose connecting standard data so as to output the converted data to the device side I/O terminal 3.

The second data converting section 8b demonstrates functions that convert data, which are captured from the device side I/O terminal 3 into the memory card adapter (general-purpose connecting standard data), into data of the memory card connecting standard on which the second memory card MC2 is based, so as to output the converted data to the memory card side I/O terminal 6b, and convert data, which are captured from the memory card side I/O terminal 6b into the memory card adapter (data of memory card connecting standard on which the second memory card MC2 is based), into general-purpose connecting standard data so as to output the converted data to the device side I/O terminal 3.

The third data converting section 8c demonstrates functions that convert data, which are captured from the device side I/O terminal 6a into the memory card adapter MA (data of the memory card connecting standard on which the first memory card MC1 is based), into data of the memory card connecting standard on which the second memory card MC2 is based so as to output the converted data to the memory card side I/O terminal 6b, and convert data, which are captured from the memory card side I/O terminal 6b into the memory card adapter (data of the memory card connecting standard on which the second memory card MC2 is based), into data of the memory card connecting standard on which the first memory card MC1 is based so as to output the converted data to the device side I/O output terminal 6a.

Then, an operation of the memory card adapter MA will be explained below.

Firstly, the first and second memory cards MC1 and MC2 are housed and installed into the concave portions 5a and 5b, respectively, so that the connecting terminals T1 and T2 of the first and second memory cards MC1 and MC2 are connected electrically with the memory card side I/O terminals 6a and 6b, respectively.

The memory card adapter MA into which the first and second memory cards MC1 and MC2 are installed is inserted into the slot B1 of the memory card installation part B of the personal computer A so that the device side I/O terminal 3 of the memory card adapter 21 is electrically connected with the connecting terminal B2 of the personal computer A.

In this state, data based on the general-purpose connecting standard (PCMCIA standard) are output from the personal computer A to the memory card adapter 21. At this time, selection information of the memory card is attached to the data to be output.

As a result, the connection switching part 7 to which the data are supplied from the personal computer A selects an output destination of the data based on the selection information attached to the data. Namely, the connection switching part 7 selects one of the memory card side I/O terminals 6a and 6b or both of them as the output destination of the data.

The data output from the connection switching part 7 are converted into data which adapt to the memory card connecting standard on which the memory cards MC1 and MC2 is based by the first data converting section 8a and/or the second data converting section 8b, and the converted data are supplied from the memory card side I/O terminals 6a and 6b to the corresponding memory cards MC1 and MC2 so as to be stored there.

Meanwhile, a request for capturing the data from the memory cards MC1 and MC2 is output from the personal computer A to the memory card adapter 21. As a result, the connection switching part 7, to which the request for capturing the data is supplied from the personal computer A, selects a data capturing destination based on capture information. Namely, the connection switching part 7 selects one of the memory card side I/O terminals 6a and 6b or both of them as the data capturing destination.

As a result, the data capturing request is output to the memory card MC1, MC2 which is specified as the data capturing destination via the connection switching part 7 and the memory card side I/O terminal 6a, 6b. The memory card MC1 or MC2 or both the memory cards MC1 and MC2 which receive(s) the data capturing request output(s) the requested data to the first or second data converting section 8a, 8b via the memory card side input terminal 6a, 6b. In the first or second data converting section 8a, 8b, the input data are converted into data which adapt to the general-purpose connecting standard (PCMCIA standard) so as to be output to the personal computer A via the connection switching part 7 and the device side I/O terminal 3.

Furthermore, a data transmitting request between the memory cards is output from the personal computer A to the memory card adapter 21. Here, as one example, the explanation will be given as to the case where the data are transmitted from the first memory card MC1 to the second memory card MC2, but needless to say, the same explanation will be applied to the case where the data are transmitted from the second memory card MC2 to the first memory card MC1.

The data transmitting request between the memory cards is supplied to the third data converting section 8c as well as each memory card MC1, MC2. The first memory card MC1 to which the data transmitting request is supplied outputs the requested data to the third data converting section 8c via the device side I/O terminal 6a.

The third data converting section 8c converts the supplied data into data which adapt to the memory card connecting standard on which the second memory card MC2 is based, then outputs the converted data from the memory card side I/O terminal 6b to the second memory card MC2 and stored therein.

Another Embodiment (1) In the case of the memory card adapter of the present invention, three or more memory card side I/O terminals may compose the installation part.

(2) In the case of the memory card adapter of the present invention, the embodiment can be carried out on various memory card adapters.

Figure 3:
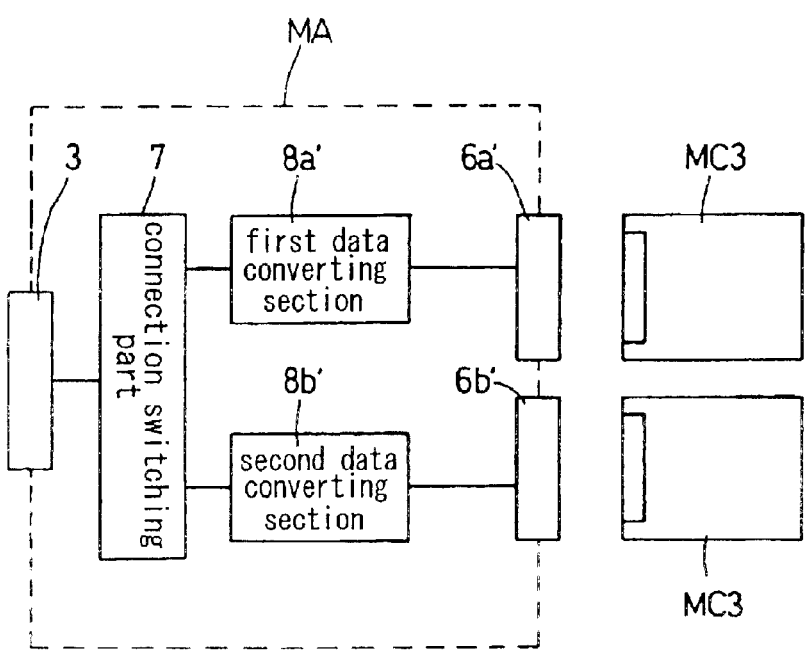
FIG. 3 is a block diagram showing a circuit configuration of the memory card adapter of FIG. 1 according to a first modified example.

(3) In the case of the memory card adapter of the present invention, as shown in FIG. 3, data can be mutually transmitted between the third memory cards MC3, MC3 based on the same memory card connecting standard and a memory card connecting equipment A based on the general-purpose connecting standard. In this case, memory card side I/O terminals 6a' and 6b' have the same structure. Similarly, first and second data converting sections 8a' and 8b' have the same structure. Moreover, the third data converting section 8c is not necessary.

(4) In the case of the memory card adapter of the present invention, as shown in FIG. 4, data may be transmitted between the memory cards MC4 based on the general-purpose connecting standard or the like. In this case, memory card side I/O terminals 6a" and 6b" also have a terminal structure based on the general-purpose connecting standard. Moreover, the first and second data converting sections 8a and 8b are not necessary.

(5) In the case of the memory card adapter of the present invention, as shown in FIG. 5, a protrusion 10 is provided, and an installation part 2' may be provided on the protrusion 10. Namely, the protrusion 10 protrudes from the memory card connected device A in the state that the main body 1 is installed into the memory card connected device A, and the installation part 2' is provided on the protrusion 10. Since the protrusion 10 provided in such a manner protrudes from the memory card connected device A, the protrusion 10 can be formed so as to have an arbitrary size. For this reason, the installation part 2' is provided on the protrusion 10 so that the installation part 2' into which an arbitrary number of memory cards (in the drawing, three memory cards MC5 through MC7) can be installed can be formed.

Here, it is considered that the protrusion 10 which is enlarged in order to form the large installation part 2 is intrusive during use, but in this case, a connecting part 11, which connects the protrusion 10 and the main body 1 in a bendable state, may be provided therebetween. Since the protrusion 10 may be folded along a surface of the memory card connected device A by the connecting part 11, even in the case of the enlarged protrusion 10, it is seldom intrusive during use.

(6) In the case of the memory card adapter of the present invention, the adapter may be constituted so that data are transmitted between the device side I/O terminal 3 and the memory card side I/O terminal group 6 only in arbitrary direction (the device side I/O terminal 3→ memory card side I/O terminal group 6, or the memory card side I/O terminal group 6→ device side I/O terminal 3).

(7) In the case of the above-mentioned embodiment, data are transmitted between the memory cards based on the request for transmitting data between the memory cards from the memory card connected device A, but a special power source is provided to the memory card adapter so that data can be transmitted between the memory cards even in the state that the adapter is separated from the memory card connected device A.

The memory card adapter as such a memory card installer serves also as the data transmitter.

Figure 6:
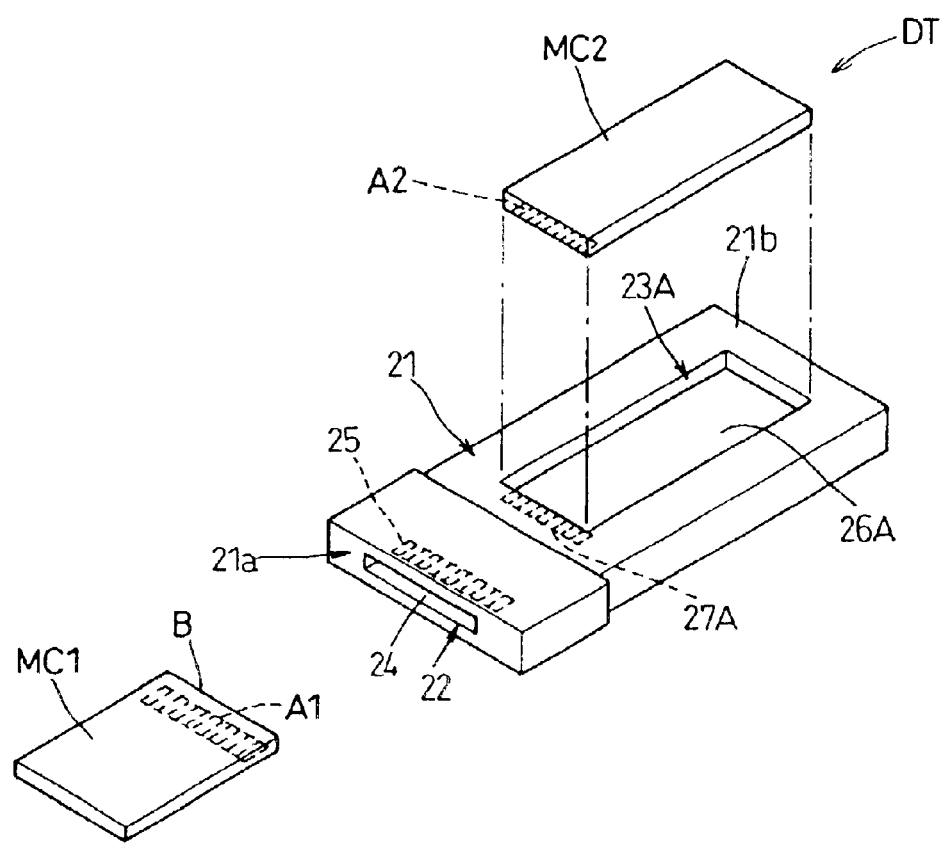
FIG. 6 is a perspective view showing an appearance shape of a data transmitter according to a second embodiment of the present invention.

FIGS. 6 and 7 show the data transmitter DT.

The data transmitter DT shown in the drawings transmits data from the memory card MC1 as a data transmitting source to the memory card MC2 as a data transmitting destination, which are of different types, namely, are based on different memory card connecting standards.

Firstly with reference to FIG. 6, the data transmitter DT has a case type main body 21 which is portable and has a rectangular flat plate shape.

A transmitting source memory card installation part 22, a transmitting destination memory card installation part 23A, a data converting section 28A and a drive power source 29 are housed in the main body 21.

The transmitting source memory card installation part 22 has a concave portion 24 for installing the transmitting source memory card MC1.

The concave portion 24 is provided on one end surface 21a on one end side of the main body 21.

The concave portion 24 has a shape such that an end of an I/O terminal forming end B of the transmitting source memory card MC1 can be fitted, and a part beyond it is provided with an input terminal 25 which is connected electrically with an I/O terminal A1 of the transmitting source memory card MC1.

The transmitting destination memory card installation part 23A has a concave portion 26A for installing the transmitting destination memory card MC2.

The concave portion 26A is provided on one surface 21b of the main body 21.

The concave portion 26A has a planar shape which conforms with a planar shape of the transmitting destination memory card MC2, and the transmitting destination memory card MC2 can be housed therein. A bottom portion of the concave portion 26A is provided with an output terminal 27A which is connected electrically with the I/O terminal A2 of the transmitting destination memory card MC2.

With reference to FIG. 7, the data converting section 28A captures data of the transmitting source memory card MC1 via the input terminal 25, and converts the captured data of the transmitting source memory card MC1 into data which adapt to the memory card connecting standard on which the transmitting destination memory card MC2 is based so as to output the converted data to the output terminal 27A.

The drive power source 29 supplies a power source for performing such a data transmitting operation to the data converting section 28A. The drive power source 29 is composed of a button battery or the like.

In the data transmitter having the above structure, when a switch, not sown, is turned on in the state that the transmitting source memory card MC1 is installed to the transmitting source memory card installation part 22 and the transmitting destination memory card MC2 is installed to the transmitting destination memory card installation part 23A, the data converting section 28A captures the data from the transmitting source memory card MC1 and converts the data into data which adapt to the memory card connecting standard on which the transmitting destination memory card MC2 is based. The converted data are output to the transmitting destination memory card MC2 via the output terminal 27A so as to be recorded therein.

Figure 8:
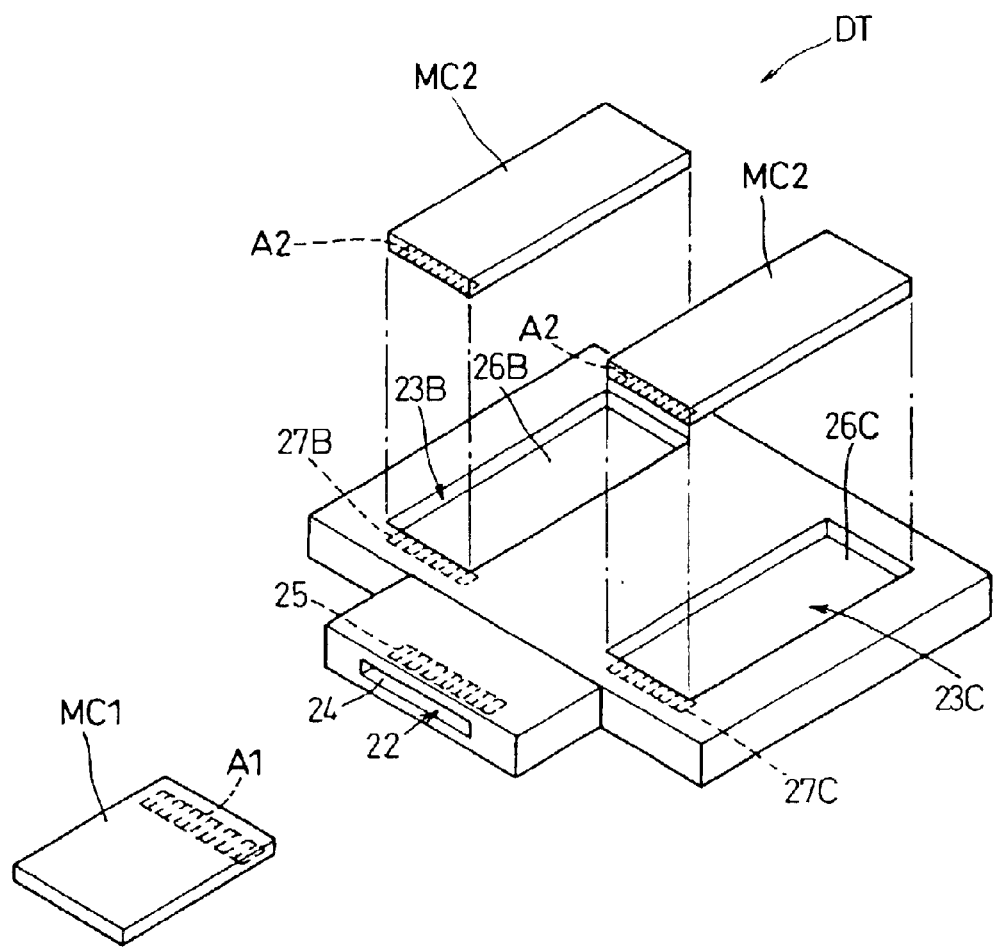
FIG. 8 is a perspective view showing an appearance shape of the data transmitter according to a third embodiment of the present invention.
Figure 9:
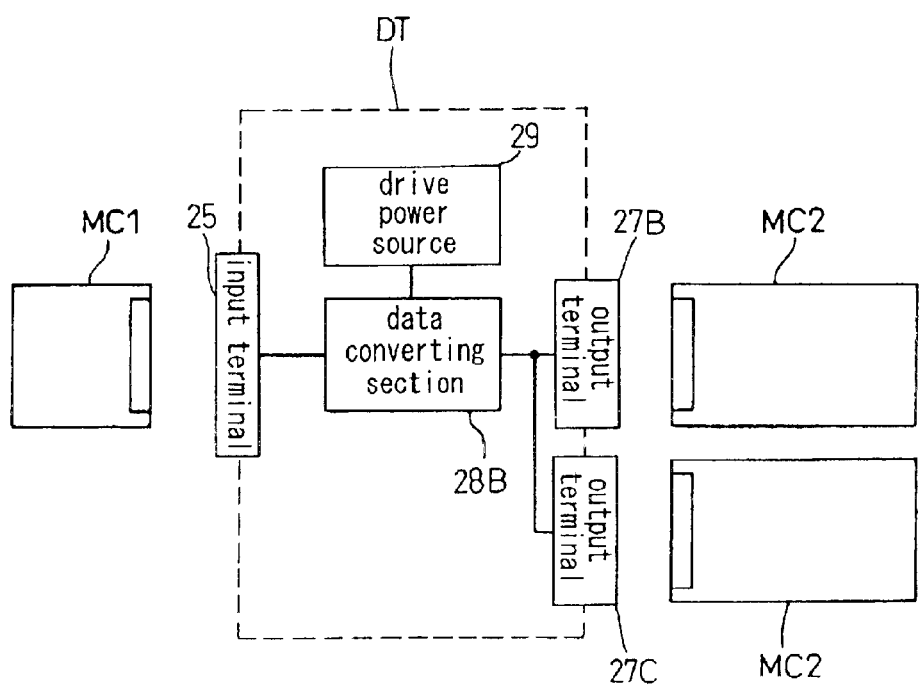
FIG. 9 is a block diagram showing a circuit configuration of the data transmitter in FIG. 8.

(7) There will be explained below another data transmitter of the present invention with reference to FIGS. 8 and 9.

The data transmitter DT basically has the similar structure to (6), and the same reference numerals are given to the same or similar parts, and detailed explanation thereof is omitted.

The data transmitter DT is constituted so as to transmit data from the transmitting source memory card MC1 simultaneously to plural transmitting destination memory cards MC2 which are of the same type, namely, are based on the same memory card connecting standard.

The data transmitter DT has a plurality of transmitting destination memory card installation parts 23B, 23C. The transmitting destination memory card installation parts 23B, 23C have concave portions 26B, 26C and output terminals 27B, 27C.

The structures of the concave portions 26B, 26C and the output terminals 27B and 27C are similar to the structures of the concave portion 26A and the output terminal 27A in (1), and the transmitting destination memory cards MC2 and MC2 of the same type are installed to the transmitting destination memory card installation parts 23B and 23C.

The output terminals 27B and 27C are connected to a data converting section 28B in parallel.

The data converting section 28B captures data of the transmitting source memory card MC1 via the input terminal 25, and converts the captured data into data which adapt to the memory card connecting standard on which the transmitting destination memory card MC2 is based so as to output the converted data to the output terminals 27B and 27C.

In the data transmitter DT, the data of the transmitting source memory card MC1 can be simultaneously transmitted to one or plurality of the transmitting destination memory cards MC2 and MC2.

Figure 10:
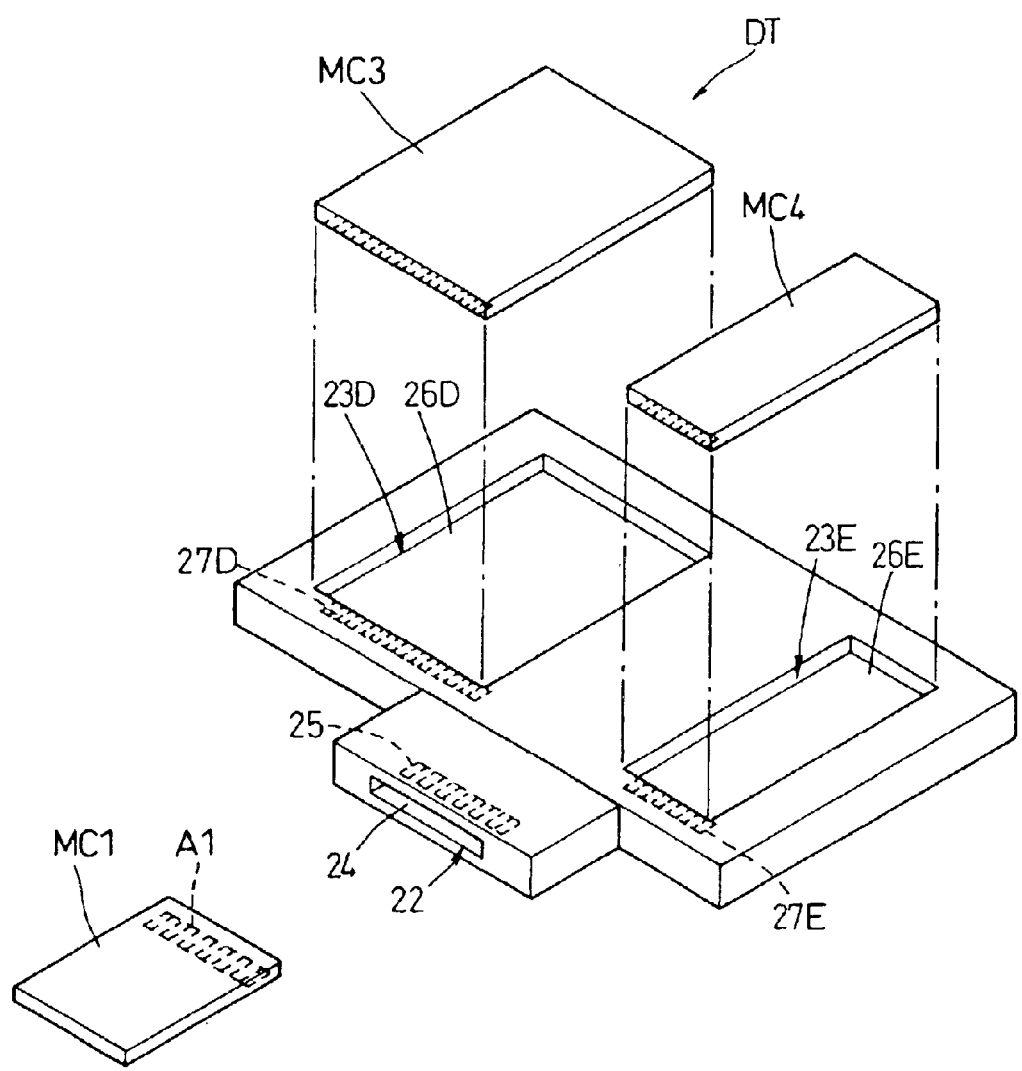
FIG. 10 is a perspective view showing an appearance shape of the data transmitter according to a fourth embodiment of the present invention.
Figure 11:
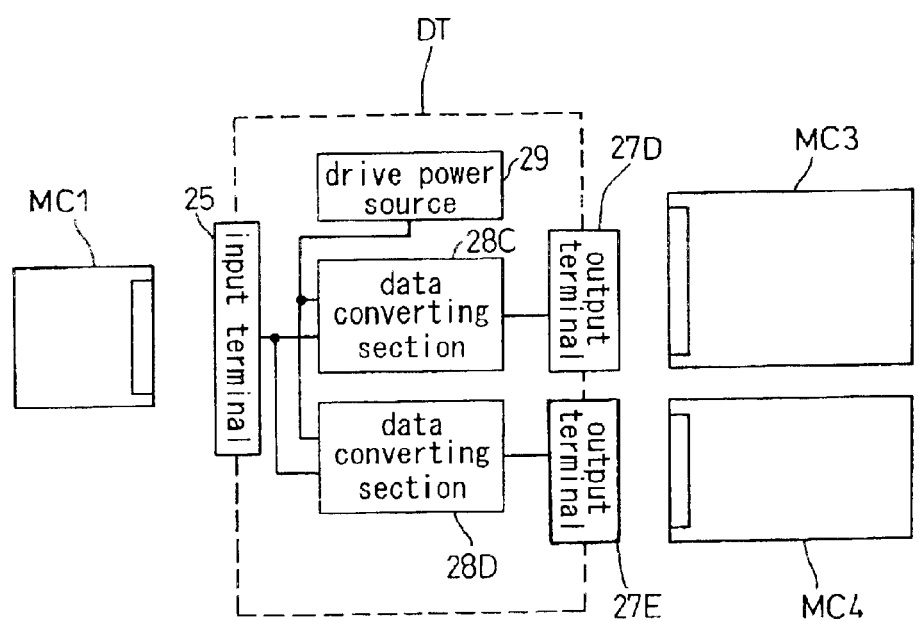
FIG. 11 is a block diagram showing a circuit configuration of the data transmitter in FIG. 10.

(8) FIG. 10 is an appearance perspective view of still another data transmitter of the present invention, and FIG. 11 is a block diagram showing its circuit configuration.

The data transmitter DT is constituted so as to transmit data from the transmitting source memory card MC1 to plural transmitting destination memory cards MC3 and MC4 which are of different types, namely, are based on different memory card connecting standards.

For this reason, the data transmitter DT has transmitting destination memory cards installation parts 23D and 23E and data converting sections 28C and 28D which adapt to the transmitting destination memory cards MC3 and MC4, respectively.

The transmitting destination memory card installation parts 23D and 23E have concave portions 26D and 26E having a shape such that the transmitting destination memory cards MC3 and MC4 can be housed, and output terminals 27D and 27E which are electrically connected with the I/O terminals A2 of the transmitting destination memory cards MC3 and MC4.

The data converting sections 28C and 28D are provided correspondingly to the transmitting destination memory cards MC3 and MC4.

The data converting section 28C converts the data of the transmitting source memory card MC1 captured from the input terminal 25 into data which adapt to the memory card connecting standard on which the transmitting destination memory card MC3 is based so as to output the converted data to the output terminal 27D.

Similarly, the data converting section 28D converts the data of the transmitting source memory card MC1 captured from the input terminal 25 into data which adapt to the memory card connecting standard on which the transmitting destination memory card MC4 is based so as to output the converted data to the output terminal 27E.

In the data transmitter DT having such a structure, the data of the transmitting source memory card MC1 can be simultaneously transmitted to one or plurality of the transmitting destination memory cards MC3 and MC4 based on different memory card connecting standards.

Figure 13:
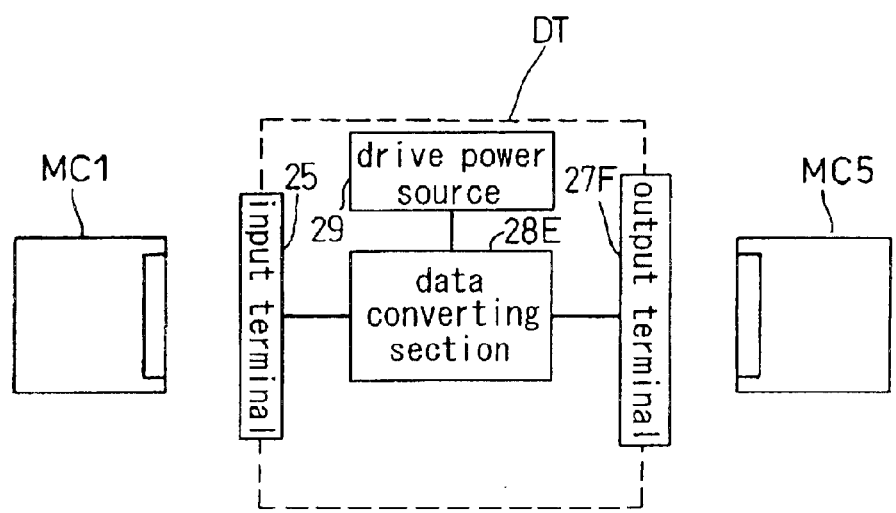
FIG. 13 is a block diagram showing a circuit configuration of the data transmitter in FIG. MA.

(9) FIG. 12 is an appearance perspective view of still another data transmitter of the present invention, and FIG. 13 is a block diagram showing its circuit configuration.

The data transmitter DT is constituted so as to transmit data to a transmitting destination memory card MC5 type of which is the same as that of the transmitting source memory card MC1.

This data transmitter has a transmitting destination memory card installation part 23F. The transmitting destination memory card installation part 23F has a concave portion 26F in which the transmitting destination memory card MC5 (the type is the same as that of the transmitting source memory card MC1) can be housed, and an output terminal 27F which is electrically connected with an I/O terminal A2 of the transmitting destination memory card MC5. A data converting section 28E captures data of the transmitting source memory card MC1 from the input terminal 25 so as to output the data to the output terminal 27F.

In the data transmitter DT having such a structure, data can be transmitted between the transmitting source memory card MC1 and the transmitting destination memory card MC5, types of which are the same.

Figure 15:
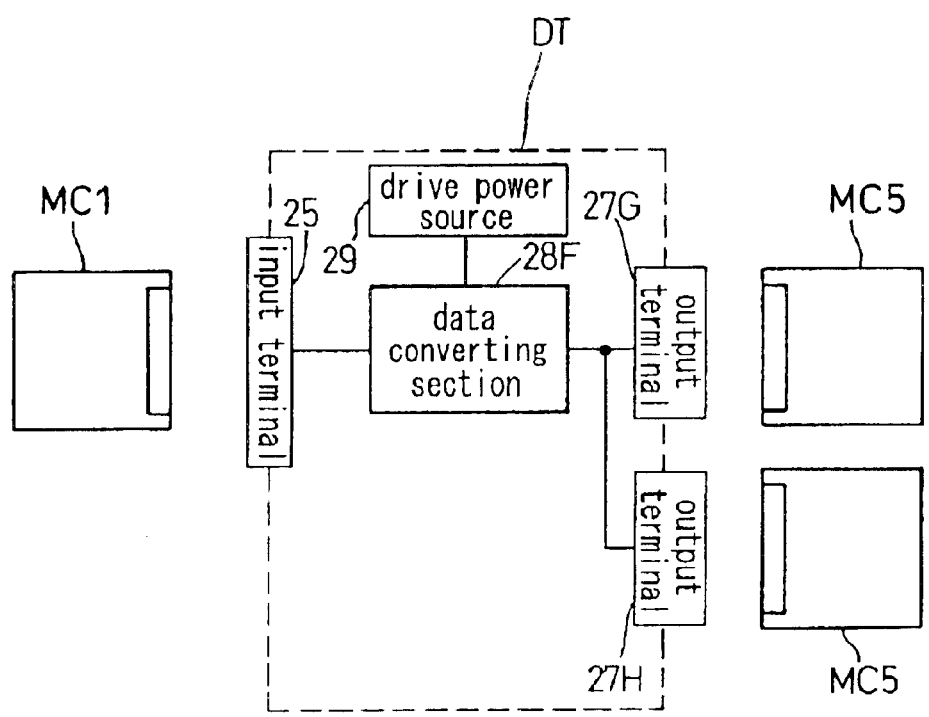
FIG. 15 is a block diagram showing a circuit configuration of the data transmitter in FIG. 14.

(10) FIG. 14 is an appearance perspective view of still another data transmitter of the present invention, and FIG. 15 is a block diagram showing its circuit configuration.

The data transmitter DT is constituted so as to transmit data simultaneously to a plurality (in this embodiment, two as the example) of transmitting destination memory cards (transmitting destination memory cards are the same type) MC5, MC5.

This data transmitter has plural transmitting destination memory card installation parts 23G and 23H. The transmitting destination memory card installation parts 23G and 23H have concave portions 26G and 26H and output terminals 27G and 27H, respectively.

The structures of the concave portions 26G and 26H and the output terminals 27G and 27H are the same as those of the concave portion 26F and the output terminal 27F, and the same type of the transmitting destination memory cards MC5, MC5 are installed to the transmitting destination memory card installation parts 23G and 23H, respectively.

Further, the output terminals 27G and 27H are connected to a data converting section 28F in parallel.

The data converting section 28F captures data of the transmitting source memory card MC1 via the input terminal 25, and outputs the data to the output terminals 27G and 27H.

In the data transmitter having such a structure, data of the transmitting source memory card MC1 can be simultaneously transmitted to one of or plurality of the transmitting destination memory cards MC5, MC5.

INDUSTRIAL APPLICABILITY

According to the present invention, in an information processing device such as a personal computer, the invention can be applied to a memory card adapter for transmitting data between a memory card and the information processing device and between memory cards.

What is claimed is:

1. A memory card installer, comprising:
a main body having a shape that can be installed to a memory card installation part provided to a device configured to be connected with a memory card;
an installation part configured to allow a plurality of memory cards to be installed;
a device side I/O terminal which is configured to be electrically connected with a device side in a state that said main body is installed to said memory card installation part;
a plurality of memory card side I/O terminals which are configured to be electrically connected with memory cards, respectively, installed to said installation part; and
a connection switching part for switching so as to connect said memory card side I/O terminals, respectively, to said device side I/O terminal,
wherein:
said device side I/O terminal is electrically connected to said device in a connecting state which is based on a device side memory card connecting standard carried out in the device,
a plurality of memory cards which are based on another memory card connecting standard different from the device side memory card connecting standard are installed to said installation part,
said memory card side I/O terminals are electrically connected to the memory cards, respectively, in a connecting state based on said another memory card connecting standard in the state that said memory cards are installed to said installation part, and
the memory card data installer further comprising data converting sections having a function for converting data captured from said device via said device side I/O terminal into data based on said another memory card connecting standard so as to output the converted data to said memory card side I/O terminals, respectively, and/or a function for converting data captured from said memory cards via said memory card side I/O terminals, respectively, into data based on said device side memory card connecting standard so as to output the converted data to said device side I/O terminal,
wherein said memory card side I/O terminals are electrically connected with a plurality of memory cards having different memory card connecting standards, respectively, and
wherein said data converting sections convert data captured from one memory card via a terminal composed of said memory card side I/O terminals into data which adapt to the memory card connecting standard on which another memory card connected to another terminal of said memory card side I/O terminals is based, so as to output the converted data to said another terminal without providing the converted data to the device side I/O terminal.

2. A memory card installer, comprising:
a main body having a shape that can be installed to a memory card installation part provided to a device configured to be connected with a memory card;
an installation part configured to allow a plurality of memory cards to be installed;
a device side I/O terminal which is configured to be electrically connected with a device side in a state that said main body is installed to said memory card installation part;
a plurality of memory card side I/O terminals which are configured to be electrically connected with memory cards, respectively, installed to said installation part; and a connection switching part for switching so as to connect said memory card side I/O terminals, respectively, to said device side I/O terminal, wherein said main body further has a protrusion which protrudes from said device in a state that said main body is installed to said device, and said installation part is provided to said protrusion, further comprising a connecting part for connecting said protrusion to said main body in a bendable state, said connecting part allowing said protrusion to be folded along a surface of the main body while the protrusion is in a state of protruding from said device.

3. A memory card installer, comprising:

an installation part to which a plurality of memory cards are installed; and data converting sections for capturing data of a transmission memory card installed to said installation part and converting the captured data into data which adapt to a memory card connecting standard on which a destination memory card is based so as to output the converted data, wherein said installation part has an input terminal which is electrically connected to said transmission memory card and an output terminal which is electrically connected to said destination memory card, wherein:

said transmission memory card and said destination memory card are based on different memory card connecting standards, and said data converting sections convert the data of said transmission memory card captured from said input terminal into the data which adapt to the memory card connecting standard on which said destination memory card is based so as to transmit the converted data to said destination memory card via said output terminal, and wherein:

a plurality of output terminals which adapt to plurality of destination memory cards based on different memory card connecting standards are provided as said output terminal, said section data converting sections convert the data of said transmission memory card captured from said input terminal into data which adapt to the memory card connecting standards on which a plurality destination memory cards are based, respectively, so as to simultaneously transmit the converted data to said destination memory cards, respectively, via said plurality of output terminals.

* * * * *